April 16, 1957 R. L. POSPISIL ET AL 2,788,791
PORTABLE AWNING
Filed Feb. 9, 1956
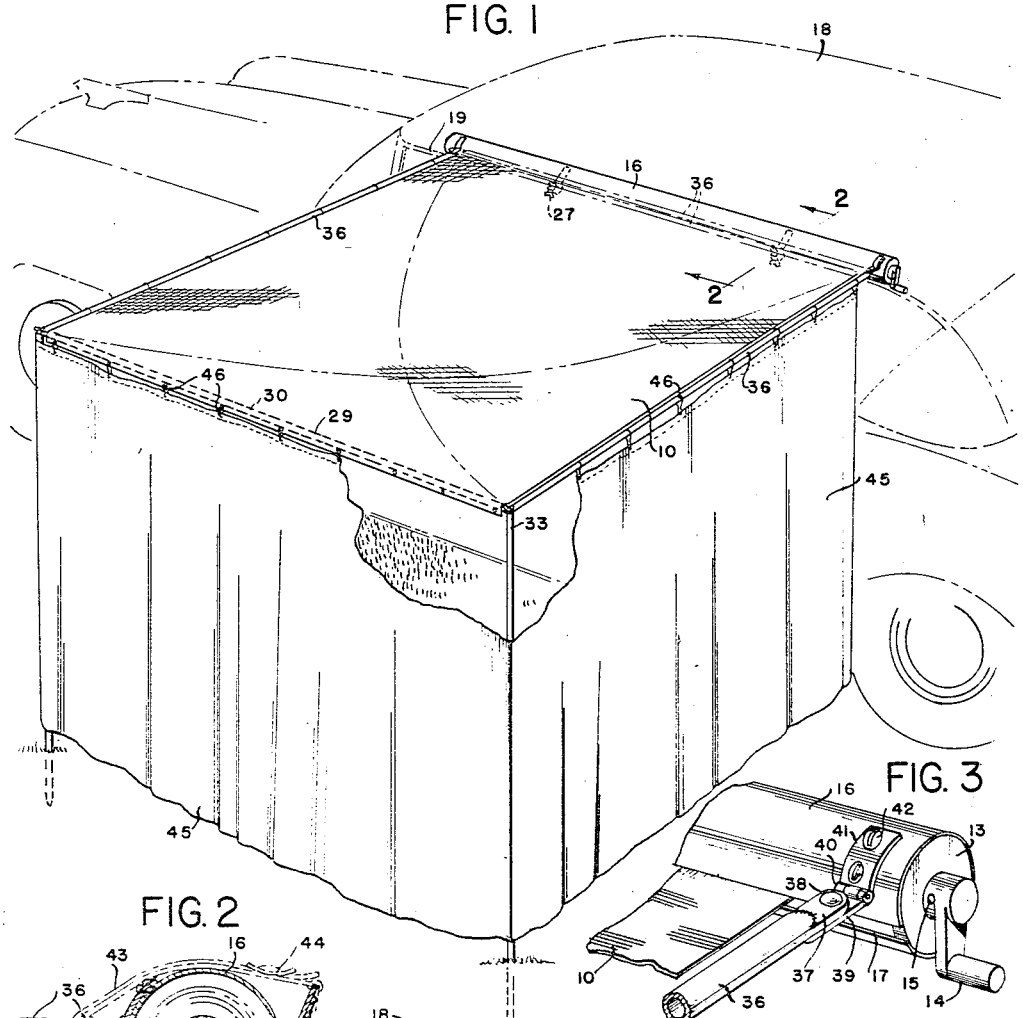
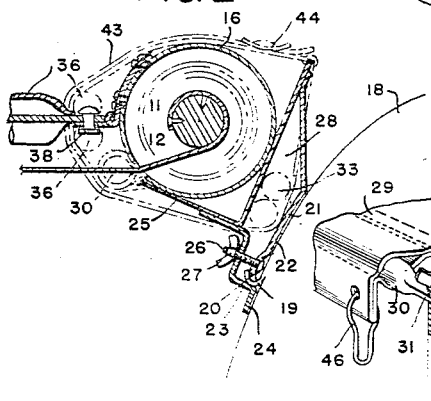
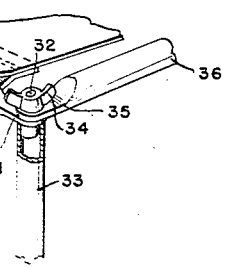
INVENTORS
R. L. POSPISIL
RALPH PHILLIPS

United States Patent Office 2,788,791
Patented Apr. 16, 1957

2,788,791

PORTABLE AWNING

Robert L. Pospisil and Ralph Phillips, Eustis, Fla.

Application February 9, 1956, Serial No. 564,514

3 Claims. (Cl. 135—5)

This invention relates to structures for protecting from the forces of nature particularly from the sun, rain and the like, and more particularly to portable structures of this character and specifically those for use in connection with mobile units such as automobiles, boats, and the like.

More particularly, this invention relates to a portable collapsible sun and weather shield or awning adapted to be foldably attached to an automobile, boat, or other mobile unit and extended and used as a shade or shelter beside the same and with such device so constructed that it can be readily extended for use or collapsed during travel of its supporting structure.

Various types of awnings, umbrellas, and the like have been employed for shielding from the sun and the weather. However they have not been sufficiently simple, inexpensive and effective in use but have been awkward requiring time to install and remove, and otherwise unsatisfactory.

It is an object of the invention to overcome the criticisms enumerated and to provide a relatively simple, inexpensive awning that can be applied to an automobile, boat or the like carried in collapsed or folded condition during transportation but easily set up for use, as well as a device of this character in which the sun and weather shielding portion of the same is of flexible sheet material which can be carried in a housing when not in use.

Another object of the invention is to provide an awning somewhat similar to a window shade including a flexible sheet and a roller, with such roller mounted in a slotted housing which can be mounted along the top of an automobile and with a crank for rotating the roller to wind and unwind the awning and with pivoted members at each side connected by side and transverse members attached to the end of the awning which side and transverse members can be disposed in a folded condition adjacent the housing and held by straps in such position until such times when the awning is not in use.

Other objects and advantages of the invention will be apparent from the following description taken in conjunction with the accompanying drawing wherein:

Fig. 1 is a perspective illustrating the invention applied to an automobile or motor vehicle;

Fig. 2, an enlarged detail section on the line 2—2 of Fig. 1;

Fig. 3, an enlarged fragmentary detail perspective showing one end of the housing; and Fig. 4, an enlarged fragmentary detail perspective showing the connection of the end and side members of the awning with a supporting post.

Briefly stated, the device of the present invention is an awning comprising a flexible sheet attached to a roller mounted in a housing having a slot through which the sheet can be wound and unwound by means of a crank located on the end of the roller exteriorly of one end of the housing. A pair of brackets are attached in spaced relation to the housing, said brackets being constructed for quick attachment and detachment along the top of an automobile or other vehicle by portions adapted to engage one within and one exteriorly of the rain trough and with a wing nut for clamping the parts together with the trough between the same. The end of the awning opposite that attached to the roller is provided with a hem for the reception of a rod or tube adapted to be engaged at each end by another rod or tube pivoted to the housing adjacent each end for maintaining the awning extended. A pair of post-forming rods or tubes are employed for supporting the corners of the awning remote from the casing and, if desired, a curtain may be hung around the three sides of the awning away from the automobile by means of conventional hooks to form a three-sided enclosure beside the automobile.

With continued reference to the drawings, the awning of the present invention comprises a flexible sheet 10 having one end attached to a roller 11 by means of fasteners 12, the parts resembling a window shade. The roller 11 is journalled in end plates or disks 13 and has a crank 14 fixed to one end of the same by means of a pin 15 exteriorly of the casing so that by operation of the crank the roller can be rotated to unwind or wind the flexible sheet 10.

About the end plates or disks 13 is mounted a housing or casing 16 adapted to protect the awning when it is wound upon the roller, said housing having a slot 17 along one side for the passage of the awning therethrough.

In view of the fact that it is desirable to have an awning which can be quickly attached to an automobile or detached therefrom, the housing 16 may be secured to an automobile having a top 18 and a strip forming a rain trough or gutter 19 along its side. In the present instance in order to provide means for mounting the awning on an automobile a two-part clamp is employed, one part having a curved extremity or jaw 20 of a configuration to fit snugly within the trough 19 and with a substantially flat additional portion 21 for engaging the top 18 along a substantial area, a gasket 22 being interposed to prevent injury to such top. In opposition to the curved jaw 20 of the clamp is a second jaw 23 having a foot 24 which also is adapted to engage the top 18 for a substantial distance and a gasket 24 being interposed beneath the same to prevent injury to such top. The cooperative members 21 and 23 are welded or otherwise secured to an L-shaped bracket 25 which in turn is welded or otherwise secured to the housing 16. Binding of the curved portion 20 and the cooperating portion 23 of the clamp is accomplished by means of a bolt 26 and wing nut 27, the bolt being welded to and extending through the jaw 20 and extending through the bracket 23. When the wing nut is tightened on the bolt 26 the parts are caused to bind against opposite sides of the trough-forming strip 19 to secure the device in place, a space 28 being provided in the bracket in which rods or the like may be stored.

The flexible sheet 10 is provided with a hem 29 along its free end remote from the roller 11 on which it is mounted and in this hem is located a rod or bar 30 having flattened ends 31 with openings therethrough for the reception in each of a stud 32 in the upper end of a corner post 33 and engaged by a wing nut 34 for binding together at each corner one end of the rod or bar 30, the upper end of one of the posts 33, and the flattened perforated end 35 of a side member or bar 36. The opposite flattened perforated end 37 of each side member 36 is fastened by a loose rivet 38 to one end 39 of a bracket having a hinge 40 by which it is joined to a curved bracket arm 41 attached by screws or other fastening elements 42 to the housing 16.

When it is desired to apply the device to an automobile, such can be quickly accomplished since it is only necessary to place the housing and its mounting in position and then tighten the wing nuts 27. Thereafter, the awning can be pulled by its hem 29 with the rod or bar 30 therein outwardly to extended position, then the side members or bars 36 can be swung from a position substantially parallel to the casing 16 outwardly to a position substantially at right angles thereto and connected to the upright posts 33 at the outer corners of the awning, such posts having been carried in the space 28 within the mounting bracket and held therein by means of strap 43, the ends of which strap are connected by a buckle or other fastener 44, and such strap having its ends attached to the upper and lower extremities of the housing supporting member 25. The strap encircles the entire structure and binds the parts into a compact package as disclosed in dotted lines in Fig. 2.

The lower ends of the posts 33 are preferably pointed and may be driven into the ground for firmness. Also, in order to provide an enclosure for privacy a curtain 45 may be disposed on the two opposite sides and around the outer end of the awning by means of hangers 46 and 47, although obviously the curtain 45 may be kept in a separate package and it is not necessary to use the same unless desired.

It will be understood from the foregoing that a simple, inexpensive shade or shield for protecting from the sun and weather is provided which not only is portable but is compact, easily set up or taken down quickly and in a minimum of time, and its use may be on a temporary or prolonged basis and will not interfere with the operation of the motor vehicle. Also, it can be used in conjunction with additional awnings to provide a cabana or other type shelter.

It will be obvious to those skilled in the art that various changes may be made in the invention without departing from the spirit and scope thereof and therefore the invention is not limited by that which is illustrated in the drawing and described in the specification, but only as indicated in the appended claims.

We claim:

1. An awning for quick attachment to and detachment from the rain trough along one side of an automobile comprising an elongated housing having an elongated opening along one side thereof, a roller in said housing, said awning being attached to said roller, means exteriorly of said housing for rotating said roller, an arm mounted adjacent each end of said housing for substantially horizontal and vertical movement so that said arm may be disposed either in extended position or in a collapsed position beside said housing and when extended the free end of said arm can be adjusted vertically in accordance with the terrain, means for supporting the outer end of said arm so that it may form a support for said awning when the latter is extended.

2. An awning for installation beside an automobile comprising a housing of a length corresponding substantially to the width of the awning, said housing having an opening along one side substantially from end to end thereof, a roller in said housing to which said awning is attached, means whereby said roller may be rotated for rolling up and unrolling said awning, mounting means for said housing comprising a two-part clamp, one part having an extremity constructed to fit within the rain trough along the side of the roof of the automobile and with a spaced substantially flat additional part for engaging the top of the automobile along a substantial area, a second part of said clamp having a foot portion adapted to engage the top of the automobile in spaced relation to the first part, and connecting means binding together the parts of said clamp so that they bear upon the roof of the automobile and engage the rain trough to secure the device in place.

3. The structure of claim 1 having means for securing said last-mentioned means closely nested beside said elongated housing.

References Cited in the file of this patent
UNITED STATES PATENTS

| | | |
|---|---|---|
| 1,315,497 | Higdon et al. | Sept. 9, 1919 |
| 1,733,007 | Dahl | Oct. 22, 1929 |
| 2,315,680 | Ward | Apr. 6, 1943 |
| 2,585,449 | Eskew | Feb. 12, 1952 |